(12) United States Patent
Sedillo et al.

(10) Patent No.: US 11,027,850 B1
(45) Date of Patent: Jun. 8, 2021

(54) ELEVATION TRACKING DEVICE

(71) Applicant: Government of the United States as Represented by the Secretary of the Air Force, Wright-Patterson AFB, OH (US)

(72) Inventors: Michael R Sedillo, Dayton, OH (US); Gregory M Burnett, Dayton, OH (US); David P Sardo, Dayton, OH (US); Sean D Sherman, Metairie, LA (US); Nathan R Stover, Xenia, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 16/653,779

(22) Filed: Oct. 15, 2019

Related U.S. Application Data

(60) Provisional application No. 62/745,845, filed on Oct. 15, 2018.

(51) Int. Cl.
*B64D 17/00* (2006.01)
*G08B 21/02* (2006.01)

(52) U.S. Cl.
CPC ............. *B64D 17/00* (2013.01); *G08B 21/02* (2013.01)

(58) Field of Classification Search
CPC combination set(s) only.
See application file for complete search history.

(56) References Cited

U.S. PATENT DOCUMENTS

| | | | |
|---|---|---|---|
| 5,623,337 A | 4/1997 | Iori et al. | |
| 5,825,667 A * | 10/1998 | Van Den Broek | B64D 17/58 |
| | | | 702/141 |
| 6,224,019 B1 | 5/2001 | Peterson et al. | |
| 6,575,408 B2 | 6/2003 | Benney et al. | |
| 8,425,073 B1 * | 4/2013 | Leegate | B64D 47/06 |
| | | | 362/108 |
| 8,746,355 B2 | 6/2014 | Demmitt | |
| 8,930,049 B2 | 1/2015 | Mamidipudi et al. | |
| 9,522,743 B1 | 12/2016 | Tolani et al. | |
| 9,776,715 B2 | 10/2017 | Zhou et al. | |
| 9,789,960 B2 | 10/2017 | Hoheisel et al. | |
| 9,863,772 B1 | 1/2018 | Moyerman et al. | |
| 9,868,537 B2 | 1/2018 | Leidich et al. | |
| 10,054,939 B1 | 8/2018 | Applewhite | |
| 2006/0186272 A1 | 8/2006 | Roseman | |
| 2018/0251232 A1 * | 9/2018 | Nikitenko | B64D 45/04 |

* cited by examiner

*Primary Examiner* — Thomas S Mccormack
(74) *Attorney, Agent, or Firm* — AFMCLO/JAZ; Chastity D. S. Whitaker

(57) ABSTRACT

The systems and methods provided herein are directed to a device for tracking a jumper's elevation during a parachute jump. The device includes an active sensor for monitoring a distance to the ground, which is disposed at an angle and transmitted from the jumper's calf to reduce the chance of self-obstruction. The device notifies the jumper in one of several ways when a threshold elevation is reached, and may take additional automated actions at particular elevation thresholds.

8 Claims, 9 Drawing Sheets

ELEVATION TRACKING DEVICE

CROSS-REFERENCE TO RELATED APPLICATIONS

This application claims the benefit of and priority to U.S. Provisional Application Ser. No. 62/745,845, entitled "Space Proximity Under-canopy Relay Sensor (SPURS)," filed on 15 Oct. 2018, the entirety of which is incorporated by reference.

STATEMENT OF GOVERNMENT INTEREST

The invention described herein may be manufactured and used by or for the Government of the United States for all governmental purposes without the payment of any royalty.

BACKGROUND AND BRIEF DESCRIPTION

Military and civilian parachutists are often injured during night jumps because they cannot see the approaching ground to adequately prepare to land. They employ tactics such as dropping equipment during final approach to gauge the distance-to-ground from the sound of their equipment impacting the ground. During combat, it's often necessary that the military para-jumper remain covert so as not to reveal their position to the enemy, so solutions utilizing technologies that can be easily detected are not desirable. Solutions utilizing radar have been explored, but the size of the radar sensor forms a barrier to its practicability as a component of a wearable piece of elevation-tracking equipment.

An elevation tracking device is body-worn parachuting system that measures relative distance to sources of interest using a combination of active and passive signal detection transducers measuring the return time of reflective energy providing spatial cues and information. The elevation tracking device incorporates embedded logic that performs real-time processing of signal acquisition to assess proximity of sources of interest and produces a user-definable multimodal stimulus alerting the wearer. The device supports interchangeable sensors, signals, and transceivers with its low-profile integrated cable management and interfaces, permitting the jumper to utilize different notification mechanisms based on the jump specifics and environment.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES can be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DESCRIPTION OF THE DISCLOSURE

The description set forth below in connection with the appended drawings is intended as a description of exemplary embodiments of the disclosure and is not intended to represent the only forms in which the present disclosure can be constructed and/or utilized. The description sets forth the functions and the sequence of blocks for constructing and operating the disclosure in connection with the illustrated embodiments. It is to be understood, however, that the same or equivalent functions and sequences can be accomplished by different embodiments that are also intended to be encompassed within the spirit and scope of this disclosure.

Generally described, the systems and methods herein are directed to a real-time elevation tracking device for use by a parachutist. The device is attached to the user during the jump. It includes sensors that track both vertical and horizontal distances to the ground and to environmental components of interest. The device provides one of a variety of alarms to alert the parachutist to these distances.

Figure 1:
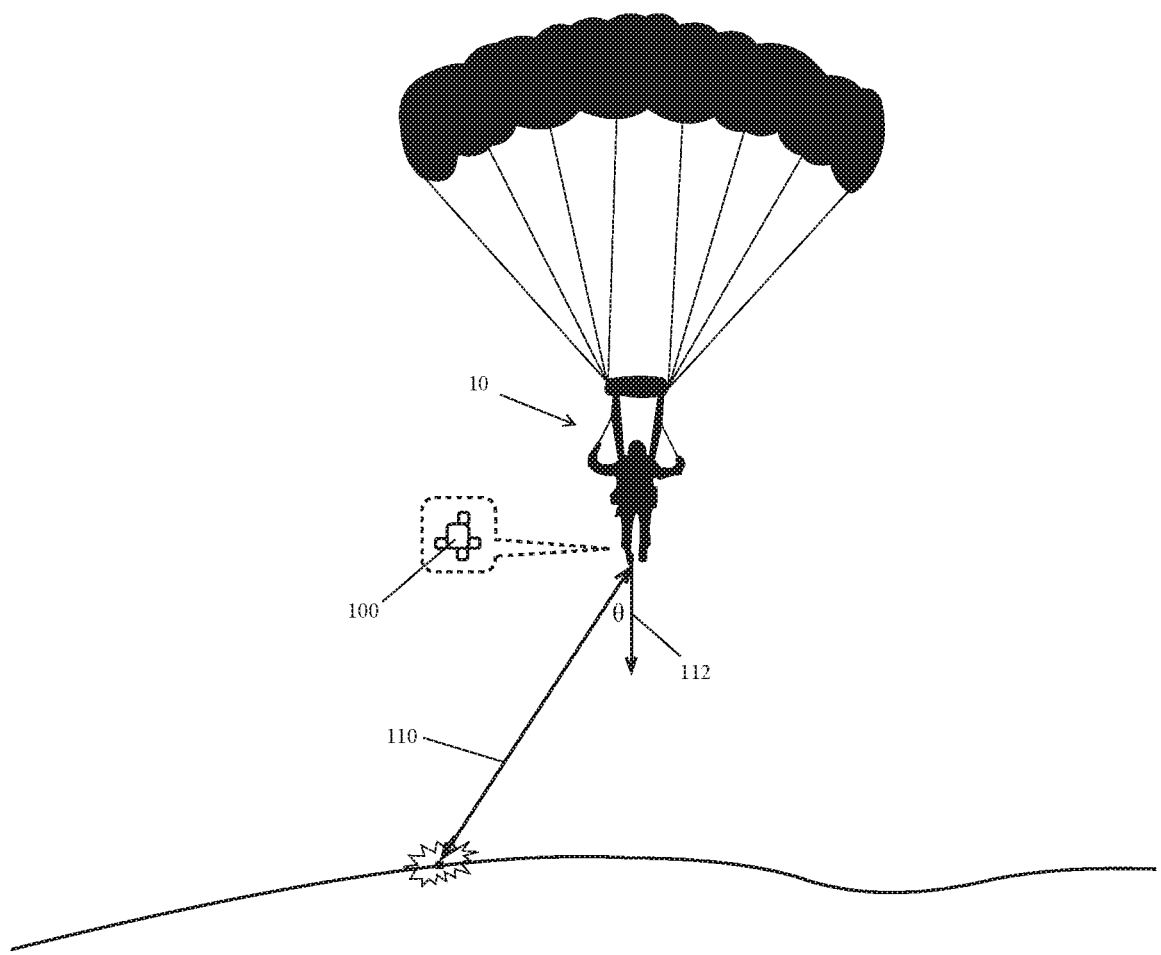
FIG. 1 is an illustration of an elevation tracking device on a parachutist in accordance with one aspect of the present disclosure.

FIG. 1 illustrates an embodiment of the elevation tracking device in use during a jump. A jumper 10 is wearing the device 100 in a manner that minimizes blockage of device sensors. In some implementations, the device is secured in a cuff attached to one of the jumper's legs, as described later in this disclosure. Depending on the details of the jump, the jumper's equipment, and any other participating jumpers, the available positioning for the device 100 may differ.

The device 100 is shown using an active LIDAR sensing mechanism to determine the jumper's altitude, defined as the jumper's distance above the local ground level. The sensing mechanism may differ within the scope of the present invention. An active sensor may be a LIDAR, RADAR, or SONAR signal, or any other energy pulse that can be both emitted and detected by a wearable device. A passive sensor, such as an optical or infrared sensor, may also be used. In some implementations, the device 100 may include multiple options for sensing that can be chosen for a particular jump based on environmental and mission considerations, such as limiting a stealth jump to passive sensing, or using an appropriate sensor type and wavelength based on the weather and terrain at the landing site.

As shown in FIG. 1, the sensor beam emitted and received along a detection line 110 may not be in the direct downward direction, but may instead be at an angle (denoted as θ in FIG. 3B and further explained below). The angle between the detection line 110 and the down direction 112 may be, in some implementations, less than 60°. For example, the device 100 may be attached to the jumper's leg such that, when the jumper is standing upright or the jumper's leg is otherwise entirely vertical, the detection line 110 will be approximately 30° offset from directly downward 112. The angle offset reduces the risk of the device sensors inadvertently picking up obstructions such as the jumper 10 or their gear.

Figure 2:
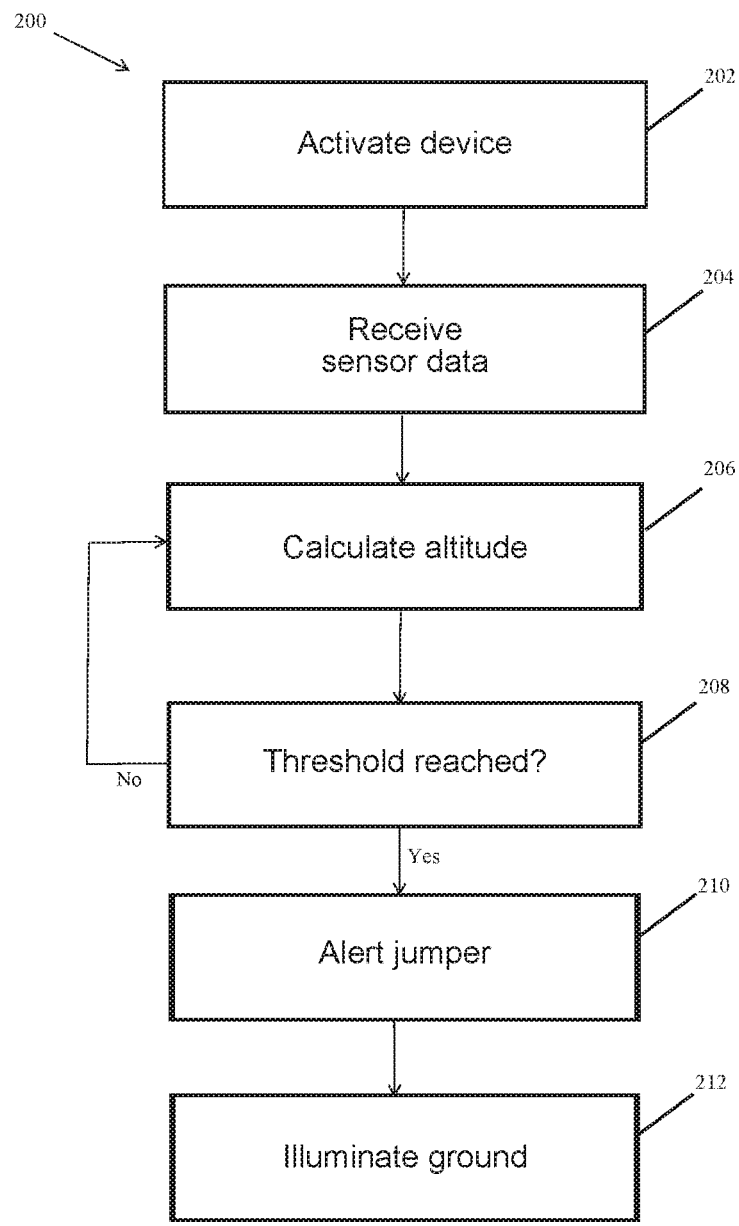
FIG. 2 is a flowchart describing a process for tracking the elevation of the jumper in accordance with one aspect of the present disclosure.

FIG. 2 is a flowchart illustrating an exemplary method 200 for the device. The device is first activated by a triggering event (step 202). This may be done manually, such as by the jumper or another individual activating a button or switch on the device. In some implementations, the device may be configured to receive a command signal, such as by radio, that activates the device. In some implementations, the device may activate automatically when it detects a jump, such as by recording an acceleration above a given threshold.

Once the device is activated, it receives data from one or more associated sensors (step 204). As described below, the data may be received by sensors integrated into the device, such as LIDAR, RADAR, SONAR, a GPS receiver, an accelerometer, a gravity gimbal, and the like. In some implementations, data may be received by sensors exterior to the device, such as sensors associated with other of the jumper's wearables. In some implementations, the device may communicate with ground-based sensors, which may be active energy-emitting sensors or passive receiving sensors in different embodiments.

The device uses the received data to calculate an altitude measurement for the jumper (step 206). Where an active ground sensor is used, as described above with respect to FIG. 1, the calculation of ground distance may take into account the angle between the downward direction and the direction of the ground sensor beam. The device may include a gimbal or other directional sensor that provides the angle $\theta$ between the ground sensor beam direction and the direct downward direction. The altitude values may be in any of a number of different formats in different embodiments, such as an absolute elevation measurement elevation measurement or a relative vertical distance offset. In some implementations, the device may also track a horizontal (ground) distance from a target point as well as a vertical altitude.

For example, if the directional sensor provides data that the beam direction is angle $\theta$ offset from directly downward, and the ground sensor provides data that the ground is a distance d away, then the basic trigonometric formula for the jumper's actual altitude h above the ground is:

$$h = d * \cos(\theta) \quad (1)$$

More complicated calculations may be used in some embodiments. For example, the sensor data may include a modeled acceleration a based on the known drag of the jumper versus freefall due to gravity, and may have modeled an estimated downward velocity v based on time-marked elevation results, air measurements, and the like. If t seconds have passed since an elevation $h_0$ was determined at estimated velocity $v_0$ and acceleration $a_0$, an extrapolated elevation $h_t$ may be:

$$h_t = h_0 - v_0 * t - (0.5) * a_0 * t^2 \quad (2)$$

In some implementations, extrapolated elevation may only be used until another elevation value can be calculated from new sensor data. A difference between the calculated values and the estimated values may, in some systems, be used to adjust the modeled values used to generate the estimates. Estimated values may be used to trigger alerts (as further described below), or may be used to change the frequency and timing of calculations based on sensor data.

The system compares the elevation value against an established threshold (step 208), and if no threshold is reached, may continue to monitor sensor data and calculate elevation values therefrom until the threshold is reached. The threshold may be a default value, a calculated value, or a customized value. In some implementations, a plurality of thresholds may each trigger an alarm, which may be the same or different alarms among those described below and/or those recognized by one skilled in the art.

Once a threshold value is reached or exceeded, the device provides a notification to the jumper (step 210). This notification may be one or more alarms, and may include, visual, aural, and/or tactile components. In some implementations, the specifics of each notification may be selected by the same process as the selection of the threshold. For example, if the threshold is a default value, it may have a default notification associated with it. If the threshold is a calculated value, then the same algorithm that provides the calculation for the threshold may also include an automated selection of a notification type based on the factors available to the system. If the threshold is a customized value, then the user may also have the option to customize the form of the notification.

In some implementations, the notification may include a signal sent to one or more wearable devices in communication with, but separate from, the elevation tracking device. For example, a visual display may be included within a jumper's head- or eyewear. An audio device may also be disposed on or near the jumper for providing audible signals. Tactile feedback may also be provided.

In some implementations, the elevation tracking device itself may include one or more outputs for providing notifications, such as a visual display, an audible speaker, and/or a source of tactile feedback. Based on the device's position on the jumper and the specifics of the jump, the device can be configured to provide notifications that will be perceived by the jumper.

As an illustrative example, a high-altitude stealth jump may involve three notifications. The original jump is from 30,000 feet, with tactile notifications to be given at 25,000, 20,000, and 10,000 feet. At 25,000 feet, a single long vibration is given; this is repeated for a total of three such pulses. At 20,000 feet, a short followed by a long vibration is given; this is again repeated for a total of three notification (six pulses). Finally, at 10,000 feet, two short and one long vibration is given. After two repetitions, this will total nine pulses.

In addition to these regular signals, in the illustrative example, an emergency notification may be triggered at 5,000 feet. The notification may only be triggered if the device determines that the jumper has exceeded a maximum safe speed at this low altitude. For example, where the jumper is expected to open their parachute no later than 10,000 feet, an indication from sensors that the jumper is still at or near freefall acceleration at 5,000 feet may trigger this emergency notification. The emergency notification may be a more noticeable alarm than the tactile alarms noted above, and may include audible and/or visual components as well as a tactile component. In some implementations, the device may also be configured to carry out additional functions if the emergency alarm is triggered, such as signaling one or more automated emergency systems, sending a warning or distress signal to another entity, or even directly controlling and deploying one or more other components of the jumper's equipment.

In some implementations, a visual notification of crossing an elevation threshold may include providing illumination (step 212). In addition to notifying the jumper, this illumination may, in some embodiments, provide the jumper with details of the terrain, facilitating the avoidance of ground obstacles. For example, the device may include an array of high-luminance light emitting diodes (LEDS) that are activated when the predetermined altitude is reached.

Figure 3A:
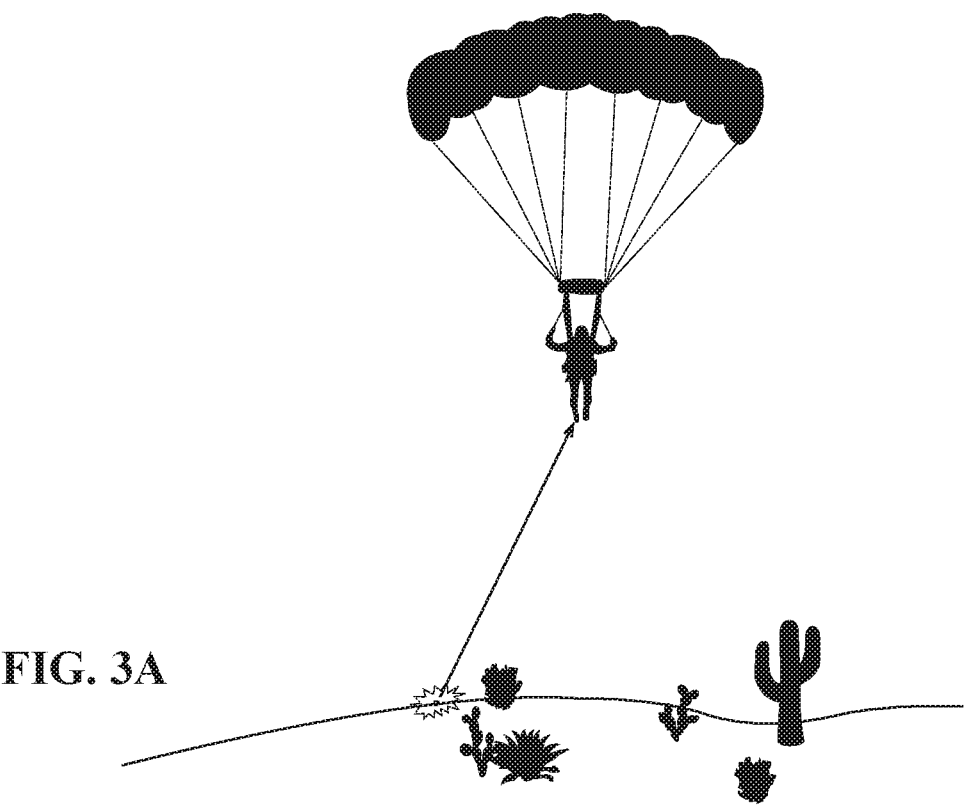
FIGS. 3A and 3B illustrate ground illumination by the device in accordance with one aspect of the present disclosure.
Figure 3B:
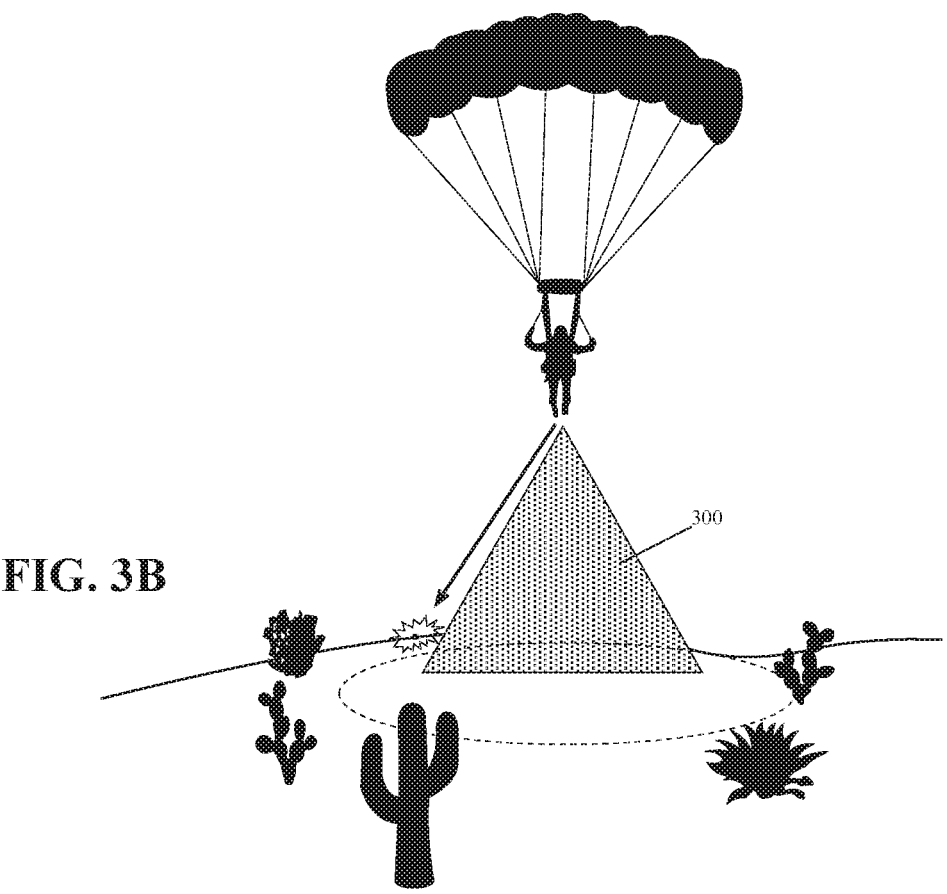

FIGS. 3A and 3B illustrate an example of illumination provided at a threshold elevation in accordance with implementations of the present disclosure. At a first time shown by FIG. 3A, no illumination is present. Upon determination by the elevation tracking device that the conditions for illumination (most notably, the crossing of the preset elevation threshold) are reached, illumination 300 is provided as shown in FIG. 3B, directed downward toward the terrain where the jumper is landing.

The specifics of the illumination may be selected for the environment in which the jump is taken. For example, if the jumper has eyewear configured to pick up and display a particular range outside of the regular visual range, such as infrared or ultraviolet light, then the illumination may be within this same frequency range. The intensity of the illumination may also be customized to best reflect the needs of the jumper, such as not saturating the jumper's equipment or ruining night vision.

Figure 4:
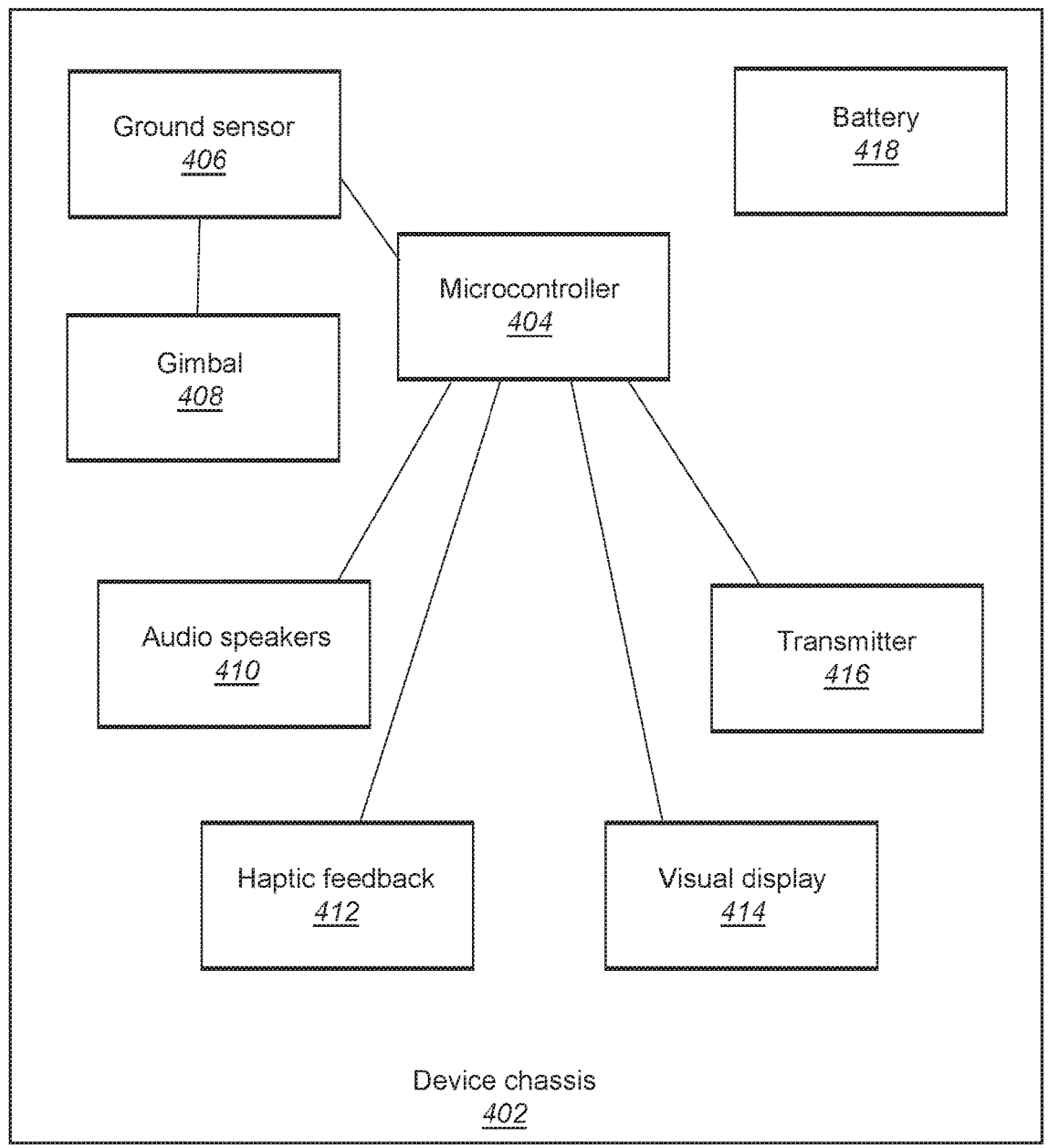
FIG. 4 is a diagram of components of the device in accordance with one aspect of the present disclosure.

FIG. 4 illustrates a component diagram of an elevation tracking device 400 as described herein. Within a device chassis 402, a number of components are in electronic communication. A microcontroller 404 controls a ground sensor 406 which receives input from a gimbal 408 in order to orient relative to gravity. The ground sensor 406 relays updated elevation determinations to the microcontroller 404, which in turn may activate the audio speakers 410, the onboard haptic feedback 412, the visual display 414, and/or the radio transmitter 416. A battery 418 may provide power to any or all of these components 402-416; in some embodiments, one or more of the device components may have separate and/or supplemental power sources other than the main device battery 418.

Figure 5A:
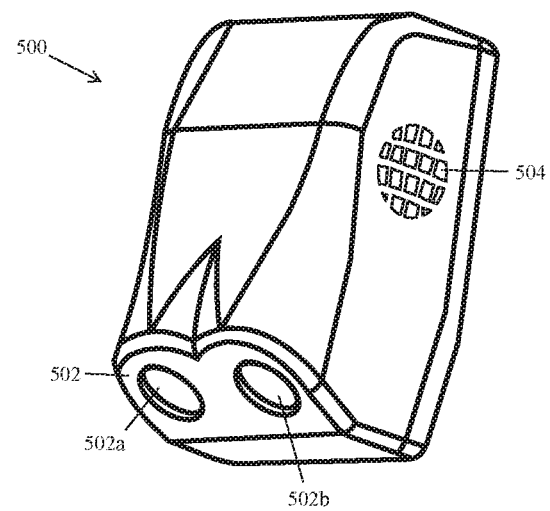
FIGS. 5A and 5B are front and rear perspective views of the device in accordance with one aspect of the present disclosure.
Figure 5B:
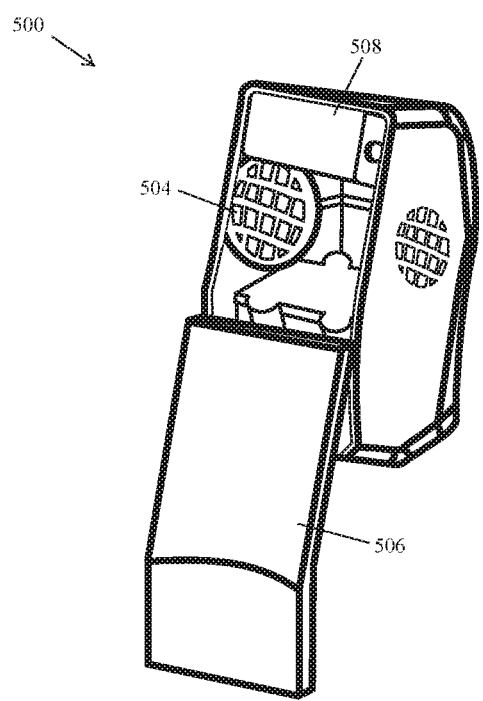

FIGS. 5A and 5B illustrate front and rear views of an elevation tracking device 500. The ground sensor 502 is shown being disposed at an angle relative to the orientation of the device 500. The illustrated ground sensor 502 is a LIDAR device having both a transmission aperture 502a and a reception aperture 502b for sending and receiving laser pulses in order to determine the distance to encountered objects, as known in the art. The grill of the speaker 504 is also shown in the side of the device chassis.

The rear view in FIG. 5B of the device 500 shows the housing door 506 moved to the open position, revealing the speaker 504 and the battery compartment 508. The device chassis is large enough to house a variety of different components, but small and light enough to strap to the jumper's leg as further described.

Figure 6A:
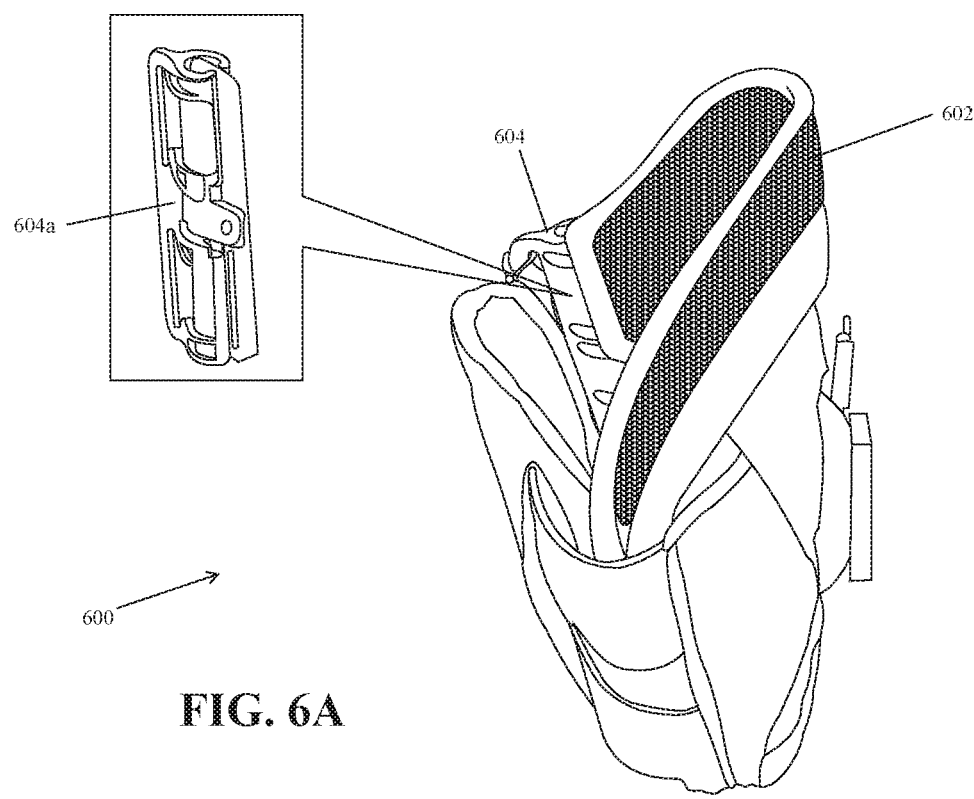
FIGS. 6A and 6B are perspective views of a cuff for securing the device in accordance with one aspect of the present disclosure.
Figure 6B:
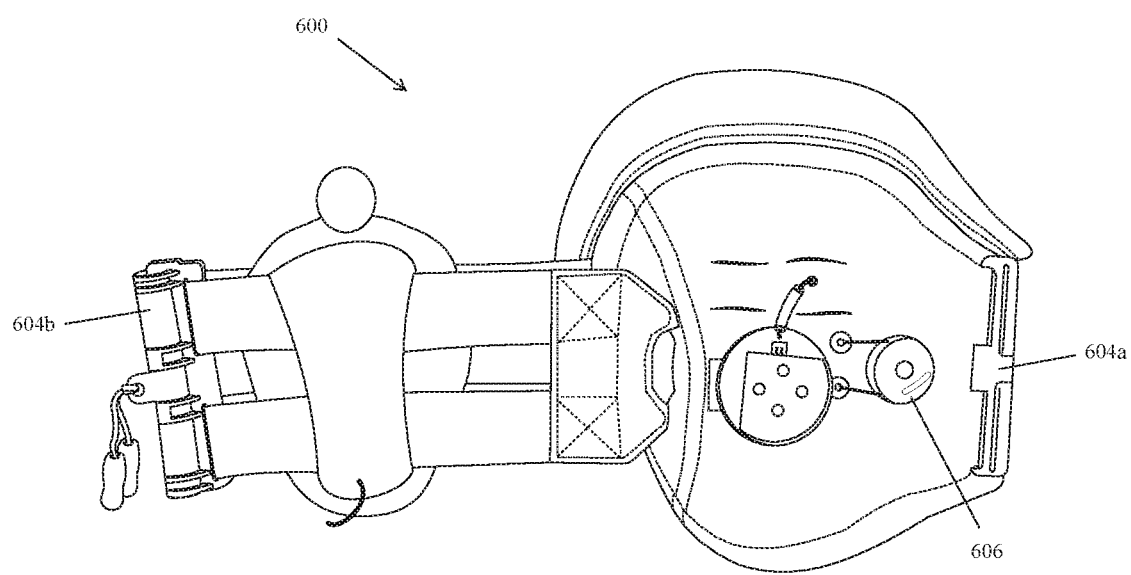

FIGS. 6A and 6B show a leg cuff 600 in closed and open positions respectively. The leg cuff 600 is configured to comfortably and safely fit around a jumper's leg while securely holding an elevation tracking device, along with any part of the jumper's equipment worn on the lower part of the leg, such as uniform pants, boots, safety straps, or the like. One of ordinary skill will recognize that the leg cuff 600 may be the outermost layer or, in some embodiments, may be an intermediate layer that is affixed along with other components of the jumper's equipment.

As shown in FIG. 6A, the leg cuff 600 may include an elastic panel 602 comprised of neoprene or other elastic material. The shape and resilience of the panel 602 may allow the cuff to fully conform to its intended location on the jumper's leg, such as the calf, without chafing or significantly shifting its position. The male end 604a of a clip 604 is shown in an expanded view. The clip may embody the features of U.S. Pat. No. 10,051,984, sold by FIRST SPEAR as the TUBES™ clip. One of ordinary skill will recognize that a variety of fasteners could be used for the cuff 600.

FIG. 6B shows the leg cuff 600 in an open position, with the female end 604b of the cuff 604 visible. The fit of the cuff may be adjustable by means of a dial 606 connected to a set of laces, which may embody the features of BOA® fit system sold by BOA TECHNOLOGY. Adjustable laces or other means of adjusting the fit of the cuff may also be used in different implementations.

Figure 7A:
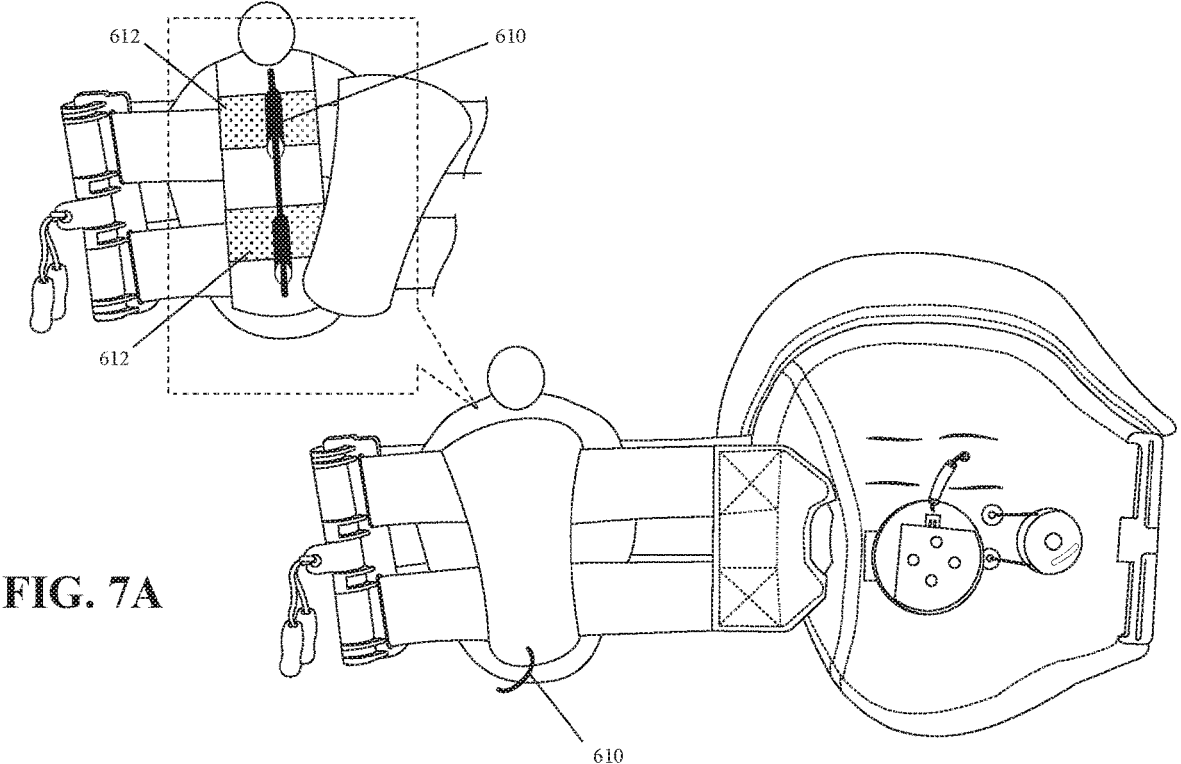
FIGS. 7A and 7B illustrate an emergency pull cable for the cuff in accordance with one aspect of the present disclosure.
Figure 7B:
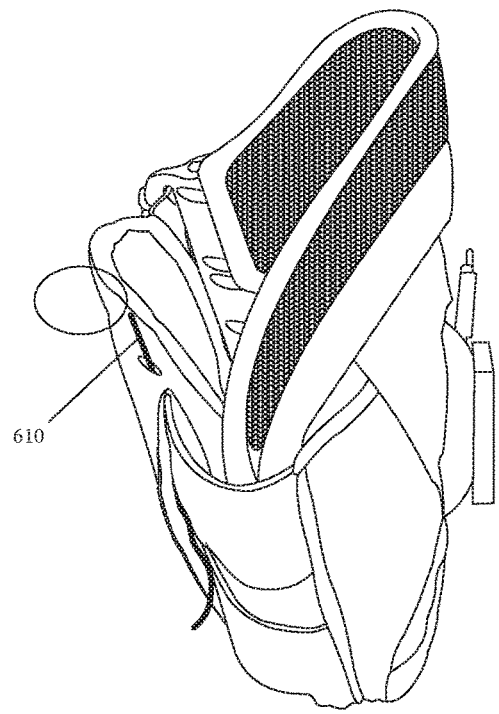

As illustrated in FIGS. 7A and 7B, the cuff 600 may further include an emergency strip cable 610 that provides an additional area of attachment for the cuff. As shown in the cross-sectional view of FIG. 7A, the cable 610 is routed through loops in the cuff straps 612. Pulling on the cable 610 with sufficient force will cause the straps 612 to separate, immediately releasing the cuff 600 from around the jumper's leg.

Figure 8A:
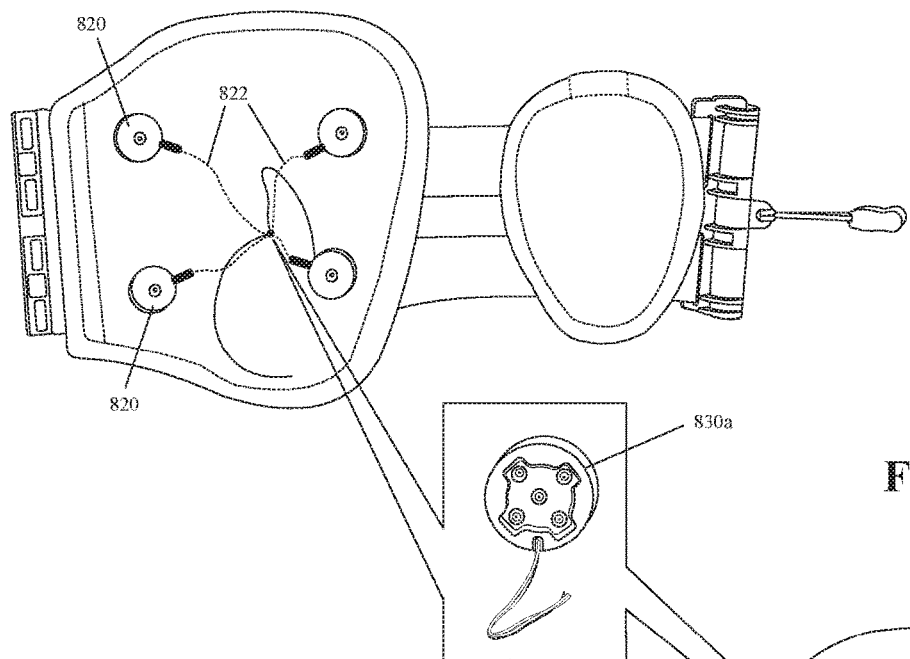
FIGS. 8A and 8B illustrate an electrical interface between the device and the cuff in accordance with one aspect of the present disclosure.

The cross-sectional and expanded views of FIG. 8A show the presence of vibrating tactors 820 within the cuff 600. The tactors 820 are in communication with the elevation tracking device by means of wires 822 disposed within the main fabric panel of the cuff 600. The wires 822 are connected to the female mount interface 830a, which is secured to the cuff 600 as shown.

Figure 8B:
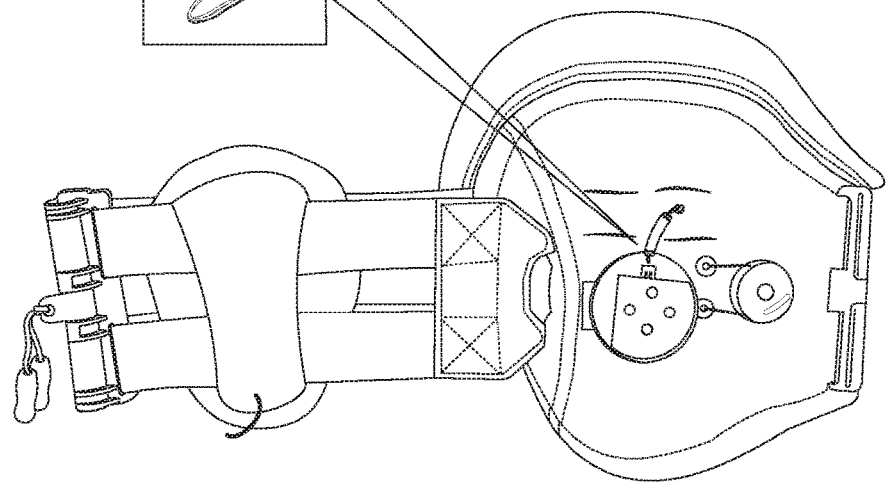
Figure 8B:
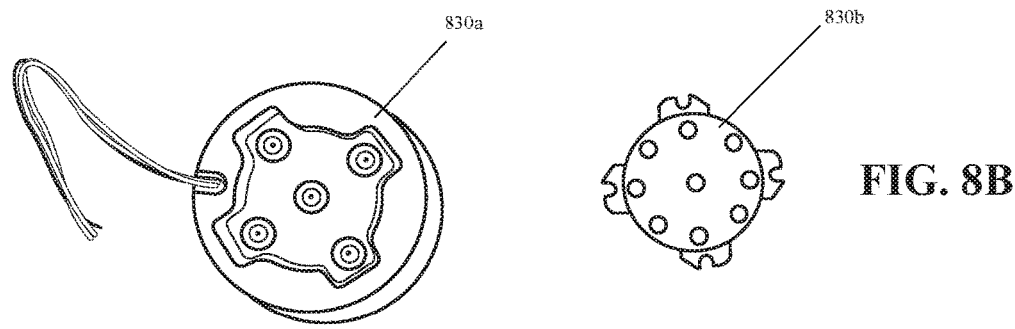

The mount interfaces are shown in FIG. 8B. The female mount interface 830a is secured to the exterior of the cuff 600 and includes electrical connections to any powered components of the cuff. The male mount interface 830b is electrically coupled to the elevation tracking device such that, when the male and female interfaces are correctly connected, the device is in contact with any powered components of the cuff.

Figure 9A:
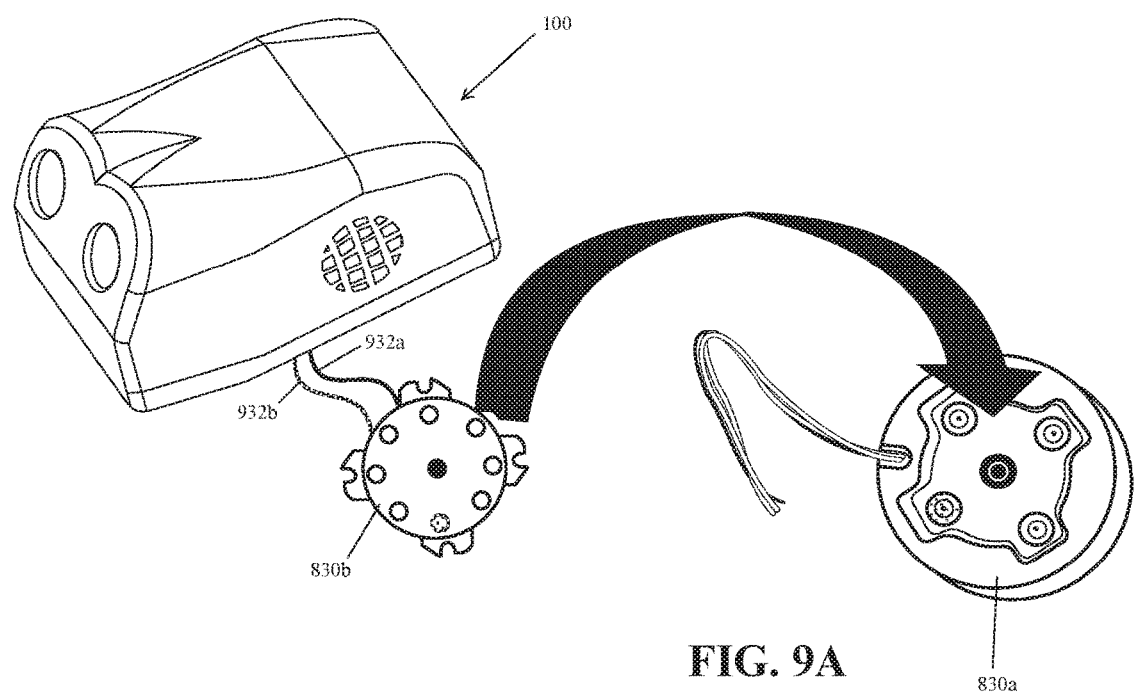
FIGS. 9A and 9B illustrate the attachment of the device to the cuff in accordance with one aspect of the present disclosure.

FIG. 9A shows an embodiment of electrical connections, in this case positive and negative wires 932a and 932b, between the device 100 and the male interface 830b. The male interface 830b is snapped into the recess of the female interface 830a, thus forming a secure electrical connection between the two.

Figure 9B:
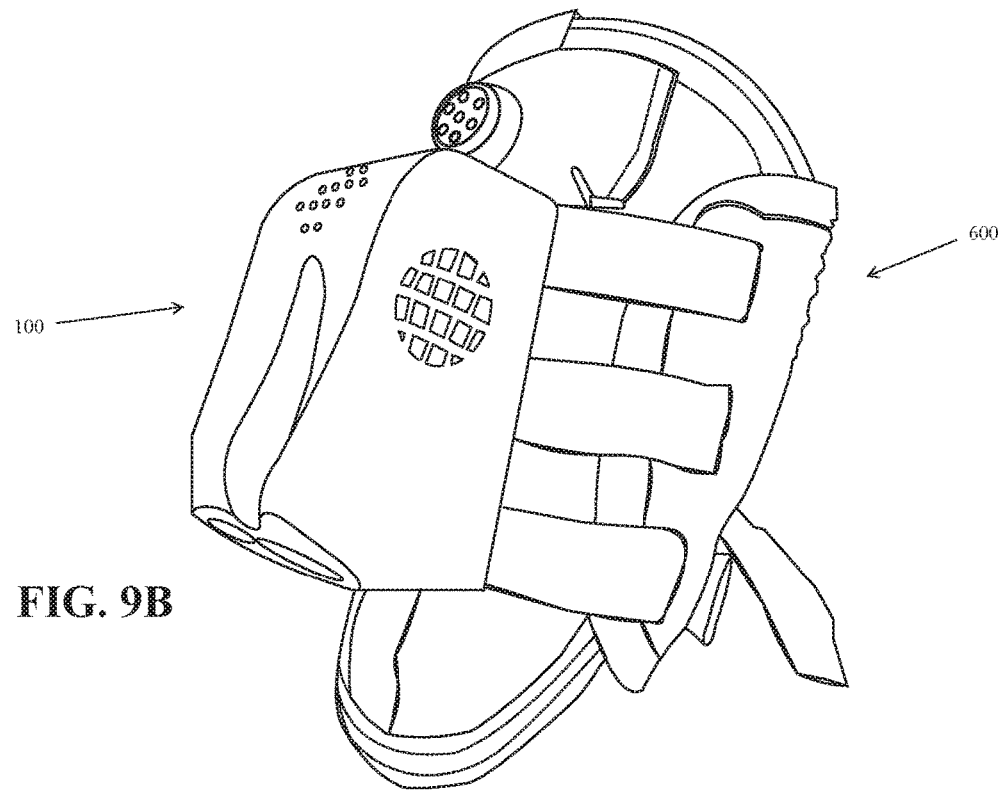

FIG. 9B shows the device 100 fully secured to the cuff 600. As shown, the device 100 is oriented such that its ground sensor will be projected at an angle from the downward direction when the cuff 600 is attached to the jumper's calf as expected.

The data structures and code, in which the present disclosure can be implemented, can typically be stored on a non-transitory computer-readable storage medium. The storage can be any device or medium that can store code and/or data for use by a computer system.

The methods and processes described in the disclosure can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described can be included in hardware components. For example, the hardware components can include, but are not limited to, application-specific integrated circuit (ASIC) chips, field-programmable gate arrays (FPGAs), and other programmable-logic devices now known or later developed. When the hardware components are activated, the hardware components perform the methods and processes included within the hardware components.

The technology described herein can be implemented as logical operations and/or components. The logical operations can be implemented as a sequence of processor-implemented executed blocks and as interconnected machine or circuit components. Likewise, the descriptions of various components can be provided in terms of operations executed or effected by the components. The resulting implementation is a matter of choice, dependent on the performance requirements of the underlying system implementing the described technology. Accordingly, the logical operations making up the embodiment of the technology described herein are referred to variously as operations, blocks, objects, or components. It should be understood that logical operations can be performed in any order, unless explicitly claimed otherwise or a specific order is inherently necessitated by the claim language.

Various embodiments of the present disclosure can be programmed using an object-oriented programming language, such as SmallTalk, Java, C++, Ada or C #. Other object-oriented programming languages can also be used. Alternatively, functional, scripting, and/or logical programming languages can be used. Various aspects of this disclosure can be implemented in a non-programmed environment, for example, documents created in HTML, XML, or other format that, when viewed in a window of a browser program, render aspects of a GUI or perform other functions. Various aspects of the disclosure can be implemented as programmed or non-programmed elements, or any combination thereof.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. An elevation tracking device, comprising:
    an active sensor configured to project a signal at a downward angle while worn by a jumper during a parachute jump, and to receive the signal when reflected from the ground in order to determine an elevation of the jumper;
    an illumination array positioned such that, upon activation during a jump, the array is configured and positioned to illuminate a ground area below the jumper; and
    a controller configured to receive elevation data from the active sensor and, in response to determining that the jumper's elevation is past a predetermined threshold, provide a notification to the jumper, and wherein the controller activates the illumination array during the jump based on the received elevation data.

2. The device of claim 1, wherein the active sensor is one of a LIDAR sensor, a RADAR sensor, a SONAR sensor, or an optical sensor.

3. The device of claim 1, wherein the provided notification includes at least one of a visual message visible to the jumper, an audio message audible to the jumper, or a tactile message tactible to the jumper.

4. The device of claim 1, further comprising:
    a leg cuff worn by the jumper for the duration of the jump; and
    a chassis containing the controller and the active sensor, the chassis secured to an exterior surface of the leg cuff for the duration of the jump.

5. The device of claim 1, wherein the controller is further configured to provide a second notification different than the first notification when a second different elevation is reached.

6. The device of claim 1, wherein the controller is further configured to provide an emergency notification different than the first notification when additional conditions are met, the conditions including at least one specified condition other than an identified elevation.

7. The device of claim 6, wherein the specified conditions for providing the emergency notification include at least one condition indicative of a malfunction in one or more pieces of the jumper's equipment.

8. The device of claim 1, further comprising an accelerometer;
    wherein the controller activates the ground sensor in response to data received from the accelerometer indicating that the jumper has initiated the jump.

* * * * *